Oct. 3, 1950     A. W. GILMORE ET AL     2,524,522
FLEXIBLE HOSE OF EXTRUDABLE ELASTOMERIC COMPOSITION
Filed Aug. 24, 1948     3 Sheets-Sheet 1
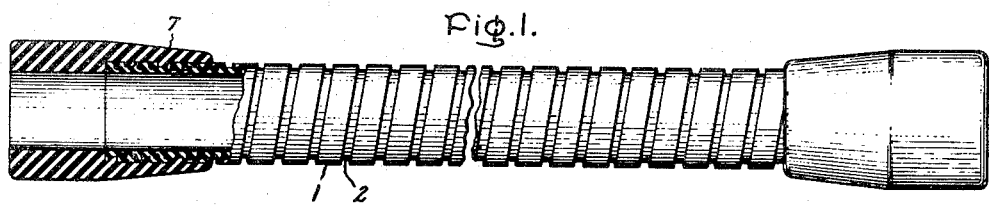
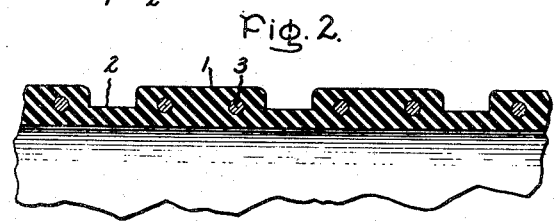
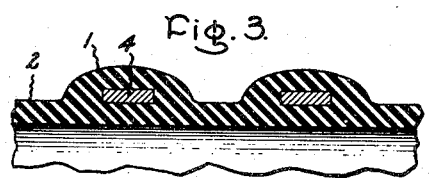
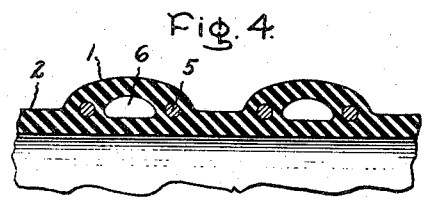
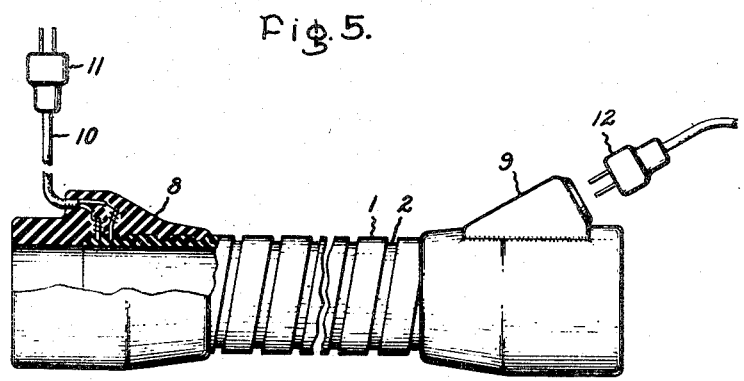
Inventors:
Arville W. Gilmore,
Glenn Koger,
by *Alfred E. Robst*
Their Attorney.

Oct. 3, 1950     A. W. GILMORE ET AL     2,524,522

FLEXIBLE HOSE OF EXTRUDABLE ELASTOMERIC COMPOSITION

Filed Aug. 24, 1948     3 Sheets-Sheet 2

Inventors:
Arville W. Gilmore,
Glenn Koger,
by Alfred E. Bobst
Their Attorney.

Oct. 3, 1950 A. W. GILMORE ET AL 2,524,522
FLEXIBLE HOSE OF EXTRUDABLE ELASTOMERIC COMPOSITION
Filed Aug. 24, 1948 3 Sheets-Sheet 3

Inventors:
Arville W. Gilmore,
Glenn Koger,
by Alfred V. Bobst
Their Attorney.

Patented Oct. 3, 1950

2,524,522

UNITED STATES PATENT OFFICE 2,524,522

FLEXIBLE HOSE OF EXTRUDABLE ELASTO-MERIC COMPOSITION

Arville W. Gilmore and Glenn Koger, Bridgeport, Conn., assignors to General Electric Company, a corporation of New York Application August 24, 1948, Serial No. 45,837

3 Claims. (Cl. 138—56)

The present invention relates to flexible hoses such as are used for conveying fluids.

The primary object of our invention is to provide an improved flexible hose which is unusually durable, relatively light in weight, and capable of being manufactured at low cost.

Other objects and the advantages of our invention will appear from the following specification, and for a consideration of what we believe to be novel and our invention, attention is directed to the following specification and to the claims appended thereto.

Figure 6:
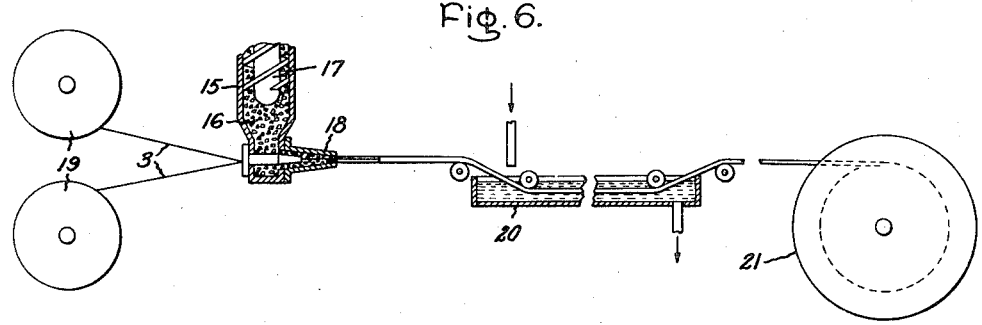
Figure 7:
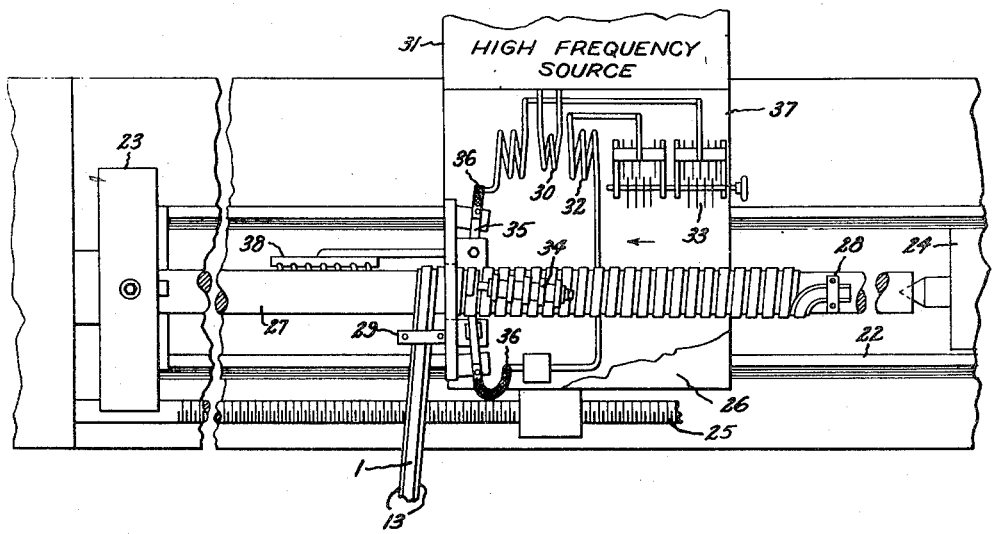
Figure 8:
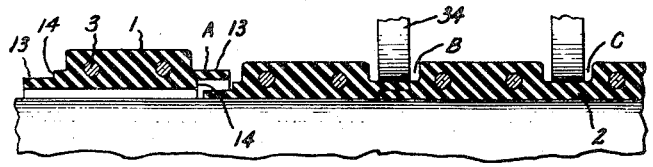
Figure 9:
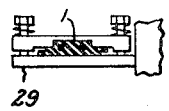
Figure 10:
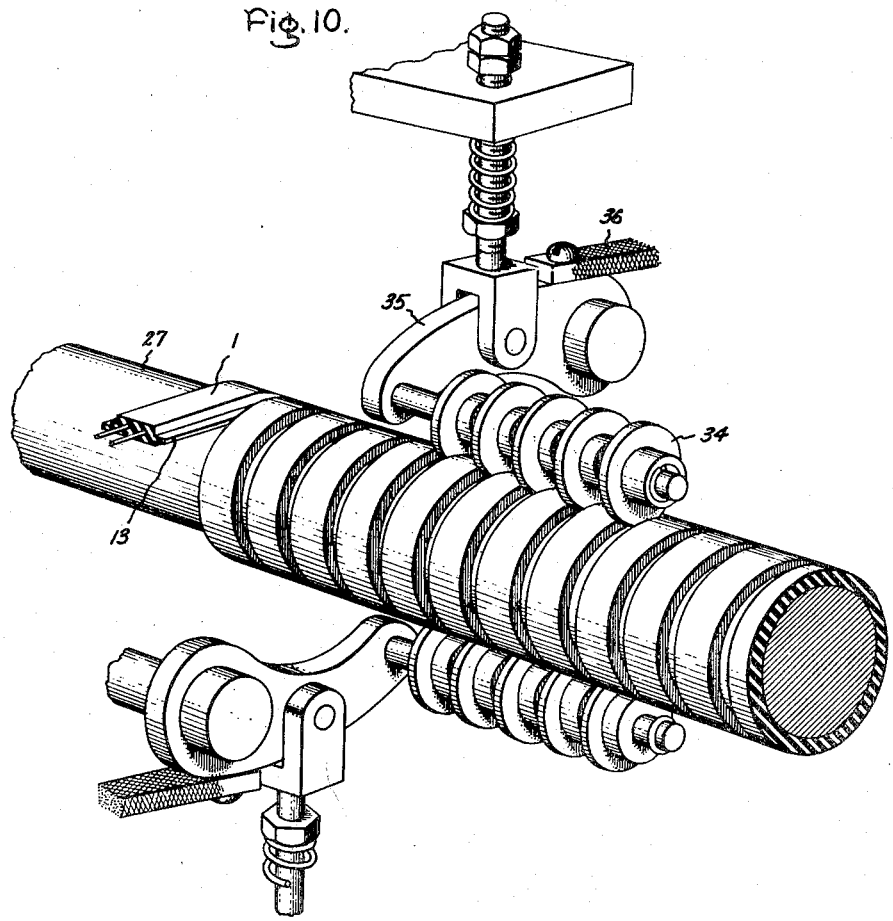
Figure 11:
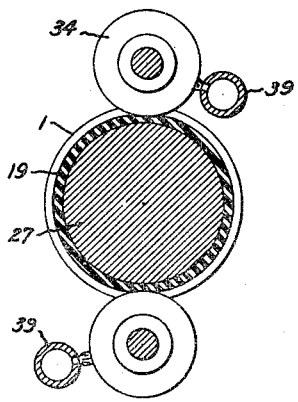

In the drawings, Fig. 1 is a side elevation, partly in section, of a hose embodying our invention; Fig. 2 is a fragmentary sectional view on a larger scale of a short length of the hose shown in Fig. 1; Fig. 3 is a view similar to Fig. 2 of a modification; Fig. 4 is a view similar to Fig. 2 of a further modification; Fig. 5 is a view similar to Fig. 1 of a modification of our invention wherein wires for conducting electric current are embedded in the hose, such wires forming also reinforcing means for the hose; Fig. 6 is a diagrammatic view showing an initial step of a method which may be used in the manufacture of our hose; Fig. 7 is a top plan view illustrating the forming of the hose; Fig. 8 is a detailed sectional view on a larger scale illustrating steps in the formation of the hose; Fig. 9 is a detail view of a guide; Fig. 10 is a perspective view on a larger scale of a part of the mechanism shown in Fig. 7; and Fig. 11 is a detail sectional view of a modification.

According to our invention, we construct a hose from an elastomeric composition, the hose comprising a plurality of spaced spiral turns which we term "ribs" united to each other at their side edges by flexible webs. The ribs are relatively thick in cross section compared to the webs and are stiff and self-supporting to render the hose non-collapsible, and they are preferably reinforced by one or more metal strips or wires or by inserts of some other suitable material. The webs serve to lend flexibility to the hose so that it may be bent readily.

The thickness of the web and its width in an axial direction may vary considerably depending on the flexibility desired and the internal or external pressure to which the hose will be subjected. An application of our invention is in the manufacture of hoses for vacuum cleaners. Here the pressure across the hose wall is relatively small and in a hose for this use having an external diameter of the order of 1½ inches we have found a web thickness of the order of $\frac{1}{32}$ inch and an axial width of the order of ⅛ inch satisfactory, the rib thickness being of the order of $\frac{3}{32}$ inch and its axial width of the order of ⅜ inch. Such a hose is quite flexible and can be bent readily on a curvature of the order of 3 inches radius.

In carrying out our invention, any extrudable elastomeric composition suited for the use to which the hose is to be put may be used. For vacuum cleaner hoses and hoses for other uses of a similar character, we have found a plasticized polyvinyl halide resin, more particularly plasticized polyvinyl chloride, to be satisfactory. Such a material provides a hose which is strong, chemically inert to most substances, and has excellent wear-resisting qualities.

Other plasticized halide resins which may be used are polyvinyl bromide, polyvinyl fluoride, etc.

Other examples of extrudable elastomeric compositions which we may use in carrying out our invention are: cellulose polymers, vinyl polymers and copolymers, butadiene polymers and copolymers, chloroprene polymers and copolymers, polyacrylates, natural rubbers, alkyds, polyesters, polyamides (super, etc.), polystyrene and butyl rubbers.

Where it is found desirable or necessary, any of the foregoing elastomeric compositions may be rendered more suitable by the addition of plasticizers, stabilizers, softeners and compounding ingredients, such as dyes, fillers, pigments, lubricants, etc. as is well understood by those skilled in this art.

Referring to the drawings, particularly Figs. 1 and 2, I indicates the ribs of the hose and 2 indicates the webs. In Figs. 1 and 2, the ribs are shown as being reinforced by two continuous wires 3 formed from stiff metal, for example, piano wire; also the ribs are shown as being rectangular in cross section, although they may have other suitable cross-sectional contour. The wires 3 may be used as electrical conductors if desired. In Fig. 3, the ribs I are rounded on their outer sides and are shown as being reinforced by a single flat reinforcing strip 4 which may be formed of a suitable metal, such as steel or copper alloy or from a suitable non-metallic strip, such as a continuous strip of hard fiber or fibrous cord or the like. In Fig. 4, the ribs I are shown as being reinforced by suitable wires 5 and as being provided with a continuous spiral passage or conduit 6, through which, if desired, a suitable liquid or gas may be circulated. A hose embodying our invention may be of any suitable length and its ends may be finished in any suitable manner to provide means by which a hose may be connected to a piece of apparatus or by which tools or nozzles may be connected to an end of the hose. In Fig. 1, the ends of the hose are provided with molded-on sleeves 7 which may be formed from rubber, for example. In Fig. 5, the ends of the hose are provided with molded-on sleeves 8 and the ends of the two reinforcing wires are shown at one end of the hose as terminating in a female electrical connector 9, the other ends being connected to the conductors of an electrical cord 10 which terminates in a connector plug 11. At 12, is an electrical plug which may be connected to connector 9. One application of our invention is hoses for vacuum cleaners, and those of Figs. 1 and 5 are well adapted for this use. When so used, one end of the hose may be provided with means for connecting it to a vacuum cleaner casing and the other end provided with means to which suction tools may be connected. In connection with the Fig. 5 construction, plug 11 may be connected to a source of power and plug 12 may be a part of a tool connected to the end of the hose, the plug supplying current to a light on the tool, to an electric motor for a motor-driven brush in the tool, or to some other electrical device.

Hoses embodying our invention may have a cross-sectional contour other than round and may be of any desired length. They may be used wherever found applicable. A hose as shown in Fig. 4 may pass two fluids, one through the hose and the other through passage 6, an exchange of heat taking place between the fluids in the two passages if desired. At the discharge end of the hose, the two fluids may be mixed with each other or they may be discharged separately.

Flexible hose embodying our invention may be manufactured by any suitable method. Preferably we employ a method such as that disclosed in Figs. 6 to 11 hereof, which method forms the subject matter of our companion application Serial No. 45,836, now Patent No. 2,516,864, and assigned to the same assignee as the instant application. According to this method, we first form a continuous strip of elastomeric composition comprising rib 1 having relatively thin fins 13 along its two side edges (see Figs. 8 and 10). The fins are positioned adjacent what may be termed the inner sides of the rib and are offset relatively to each other by amounts equal to the thickness of the fins whereby shoulders 14 are provided. Within the rib is a reinforcing means, such as the wires 3 of Fig. 2. The strip may be formed by utilizing a known construction of extruder as shown diagrammatically in Fig. 6, 15 being the extrusion barrel, 16 being the material to be extruded, 17 being the feed screw, and 18 being the extrusion die. The reinforcing means such as the wires 3 may be fed to the extruder from a pay-off or pay-off reels 19. After leaving the extruder, the strip may be passed through a water cooling bath 20 and be wound on a take-up reel 21. The die 18 is shaped to give the desired cross-sectional contour to the strip. Extruders of this type are well known in connection with the manufacture of insulated wire and cable. Their construction and operation need no further description for an understanding of the first step of the method.

Next the strip is wound spirally on a mandrel with the fins 13 overlapping as indicated particularly at A and B in Fig. 8, after which the fins are united by being fused together to form the web 2 as indicated at C in Fig. 8.

The strip may be wound on the mandrel by utilizing any suitable tool or machine. In Fig. 7, we have shown it as being wound by using a lathe. In Fig. 7, where a known type of lathe is shown, 22 indicates the lathe bed ways, 23 the lathe head, 24 the tail stock, and 25 the lead screw. The lathe carriage which is slid along the ways by the lead screw is indicated at 26. In winding a strip, a mandrel 27 is mounted in the lathe between the lathe head and the tail stock and the end of the strip is fastened to the end of the mandrel adjacent the tail stock as indicated a 28, a reel with the strip wound thereon being suitably mounted on the floor adjacent the lathe on a reel holder. The lathe is then operated to turn the mandrel to wind the strip thereon, the strip being moved longitudinally along the mandrel by the lead screw. The strip is fed to the mandrel through a suitable guide 29, as shown in side elevation in Fig. 9, attached to the lathe carriage. The guide is formed in two sections which are spring pressed toward each other, the springs being adjustable so that the strip has a snug fit in the guide.

As the strip is being wound on the mandrel or after it has been wound thereon but before being removed from the mandrel, the fins 13 are united by fusion. Heat to effect fusion of the fins may be supplied in any suitable way; preferably the fins are united by electronic sewing, i. e. heating the webs by the use of high frequency electrical curent. A form of electronic sewing mechanism is shown somewhat diagrammatically in Figs. 7 and 10 wherein an output coil or link coil 30 connected to a high frequency source 31 supplies high frequency current to a circuit including load coils 32, condenser 33, and sets of rollers 34 which ride against the fins 13 as best shown in Fig. 10. In the present instance, two sets of rollers 34 are shown, each set comprising five rollers, but more than two sets of rollers, for example four sets, may be used if found desirable. The individual rollers of each set are spaced apart and positioned at such an angle to the axis of the mandrel that they roll in the grooves between the ribs.

Each set of rollers is carried by a pivoted spring biased arm 35, as shown clearly in Fig. 10. Electrical connections for the arms are indicated at 36. The electronic sewing mechanism is mounted on an insulating plate 37 which in turn is mounted on the lathe carriage 26 so as to move therewith.

In some instances, it may be desirable to preheat the mandrel, and for this purpose, a gas burner carried by the lathe carriage is indicated at 38. Means other than a gas burner, for example, electrical means may be used for preheating the mandrel.

After the strip has been wound on the mandrel and the fins united by fusion, the mandrel may be removed from the lathe, after which the completed hose may be removed from the mandrel. In the completed hose, no seam will appear at the point where the fins are united, the fusion serving to unite the fins to form an integral web.

As stated above, means other than electronic sewing may be utilized for supplying heat for fusing and uniting the webs. In Fig. 11, is shown a modification wherein the rollers 14 are heated by gas burners 39. In Fig. 11, the mandrel is indicated at 27, the rib of a hose at 1 and a fin at 19. The foregoing method is one which we have used in the manufacture of flexible hoses embodying our invention, and we have found such method most advantageous especially when the elastomer being used is a plasticized polyvinyl chloride.

What we claim as new and desire to secure by Letters Patent of the United States is:

1. A flexible hose comprising spaced apart hollow tubular spiral ribs of elastomeric composition united by flexible webs of the same material, said hollow ribs thereby providing a spiral passage surrounding the main hose passage, and said ribs having embedded therein reinforcing means spaced apart from the hollow spiral passage.

2. A flexible hose comprising spaced apart hollow tubular spiral ribs of elastomeric composition united by flexible webs of the same material, said hollow ribs thereby providing a spiral passage surrounding the main hose passage and said ribs having embedded therein a plurality of reinforcing wires spaced apart from the hollow spiral passage.

3. A flexible hose comprising rigid spaced spiral ribs united by flexible spiral webs forming a ridged exterior and a substantially smooth interior hose, said spiral ribs being hollow and thereby providing a continuous spiral passage along the length of the hose separated from the interior of the hose, one or more continuous reinforcing elements embedded in said ribs and spaced apart from said spiral passage and said ribs and webs otherwise consisting entirely of a homogeneous elastomeric composition.

ARVILLE W. GILMORE.
GLENN KOGER.

REFERENCES CITED

The following references are of record in the file of this patent:

UNITED STATES PATENTS

| Number | Name | Date |
| --- | --- | --- |
| 132,006 | Harris | Oct. 8, 1872 |
| 133,219 | Gately | Nov. 19, 1872 |
| 375,877 | Judson | Jan. 3, 1888 |
| 1,453,220 | Witzenmann | Apr. 24, 1923 |
| 2,014,288 | Noschang | Sept. 10, 1935 |
| 2,241,355 | Maclachlan | May 6, 1941 |
| 2,330,651 | Welger | Sept. 28, 1943 |